US011472521B2

(12) United States Patent
Gai et al.

(10) Patent No.: US 11,472,521 B2
(45) Date of Patent: Oct. 18, 2022

(54) CONTROL SYSTEM FOR BOATS

(71) Applicant: Ultraflex S.p.A., Casella (IT)

(72) Inventors: Piero Gai, Casella (IT); Marcella Gai, Casella (IT); Marco Vaccari, Genoa (IT)

( * ) Notice: Subject to any disclaimer, the term of this patent is extended or adjusted under 35 U.S.C. 154(b) by 192 days.

(21) Appl. No.: 16/798,774

(22) Filed: Feb. 24, 2020

(65) Prior Publication Data

US 2020/0269962 A1 Aug. 27, 2020

(30) Foreign Application Priority Data

Feb. 25, 2019 (IT) .................. 102019000002659

(51) Int. Cl.
*B63B 49/00* (2006.01)
*B63B 79/40* (2020.01)
(Continued)

(52) U.S. Cl.
CPC .............. *B63B 79/40* (2020.01); *B63B 49/00* (2013.01); *B63H 25/02* (2013.01);
(Continued)

(58) Field of Classification Search
CPC ........ B64C 2201/127; B64C 2201/205; B63B 49/00; G01C 21/203; G08G 3/02; B63H 25/02; B63H 25/04; B63H 25/42
(Continued)

(56) References Cited

U.S. PATENT DOCUMENTS 6,690,268 B2 * 2/2004 Schofield .................. B60R 1/04
340/438
8,215,252 B1 * 7/2012 Chun ....................... B63B 39/08
114/121
(Continued)

FOREIGN PATENT DOCUMENTS

AU 2013230737 A1 * 9/2014 ........... G05D 1/0027
CN 109501974 A * 3/2019
(Continued)

OTHER PUBLICATIONS

Pedestrian Protection Systems: Issues, Survey, and Challenges; by Tarak Gandhi and Mohan Manubhai Trivedi; IEEE Transactions on Intelligent Transportation Systems, vol. 8, No. 3, Sep. 2007 (year: 2007).*

(Continued)

*Primary Examiner* — Cuong H Nguyen
(74) *Attorney, Agent, or Firm* — Themis Law (57) ABSTRACT

A control system for boats includes a direction control system of a propulsion unit having a directional control member, and an acceleration/deceleration control system of the propulsion unit having an acceleration/deceleration control member. The directional control member activates a directional unit that generates directional control signals, which set an orientation of the propulsion unit, and the acceleration/deceleration control member activates an acceleration/deceleration unit that generates acceleration/deceleration control signals, which set at least a number of (Continued)

revolutions of the propulsion unit. The control system further includes a display unit provided with a screen, and a camera having a control system that provides images of areas or zones that cannot be observed by an operator of the control system while steering the boat, so as to enable driving the acceleration/deceleration unit and/or the directional unit according to a content of those images.

17 Claims, 10 Drawing Sheets

(51) Int. Cl.
  *B63H 25/02* (2006.01)
  *G08B 21/08* (2006.01)
  *G08G 3/02* (2006.01)
(52) U.S. Cl.
  CPC .. *B64C 2201/127* (2013.01); *B64C 2201/205* (2013.01); *G08B 21/08* (2013.01); *G08G 3/02* (2013.01)
(58) Field of Classification Search
  USPC .................................. 701/21, 468; 340/438
  See application file for complete search history.

(56) References Cited

U.S. PATENT DOCUMENTS

| | | | | |
|---|---|---|---|---|
| 9,020,697 | B2* | 4/2015 | Ricci | B60R 25/00 701/36 |
| 9,207,675 | B1* | 12/2015 | Walser | G05D 1/0206 |
| 9,930,233 | B2* | 3/2018 | Singh | H04N 5/2253 |
| 10,431,099 | B2* | 10/2019 | Stewart | G01C 21/203 |
| 10,489,934 | B2* | 11/2019 | Dudar | G06K 9/00791 |
| 10,562,524 | B2* | 2/2020 | Swamidason | B60W 30/04 |
| 10,596,976 | B2* | 3/2020 | Harris | B60R 11/0229 |
| 10,640,104 | B2* | 5/2020 | Liu | B60W 50/0097 |
| 10,725,469 | B2* | 7/2020 | Harnett | G01S 13/88 |
| 10,845,812 | B2* | 11/2020 | Ward | B63H 21/213 |
| 11,198,494 | B2* | 12/2021 | Derginer | B63H 20/12 |
| 2013/0302755 | A1* | 11/2013 | Voorhees | G09B 19/16 434/30 |
| 2016/0042621 | A1* | 2/2016 | Hogg | G08B 13/19615 348/155 |
| 2016/0368578 | A1* | 12/2016 | Walke | H04N 5/247 |
| 2018/0275649 | A1 | 9/2018 | Harnett | |
| 2018/0342329 | A1* | 11/2018 | Rufo | H04L 12/2812 |
| 2019/0361457 | A1* | 11/2019 | Johnson | G05D 1/0044 |
| 2021/0166568 | A1* | 6/2021 | Kersulec | G05D 1/0206 |
| 2021/0261226 | A1* | 8/2021 | Johnson | B63B 79/15 |
| 2021/0269128 | A1* | 9/2021 | Rivers | B63B 79/40 |

FOREIGN PATENT DOCUMENTS

| | | | | | |
|---|---|---|---|---|---|
| EP | | 3699714 | A3 * | 9/2020 | B63B 49/00 |
| FR | | 3008378 | A1 * | 1/2015 | B63B 35/00 |
| IT | 201900002659 | A1 * | 8/2020 | G08B 21/08 |
| WO | 2018232376 | | 12/2018 | |
| WO | WO-2018232376 | A1 * | 12/2018 | G05D 1/0206 |

OTHER PUBLICATIONS

"Networking in Oceans: A Survey" by Shengming Jiang, College of Information Engineering, Shanghai Maritime University; ACM Computing Surveys, vol. 54, No. 1, Article 13. (Year: 2020).*
Design, Development, and Preliminary Testing of an Autonomous Amphibious Robot, by Mark Borg et al., Proceedings of The Canadian Society for Mechanical Engineering Inter. Congress; 2016 CCToMM M3 Symposium; Jun. 26-29, 2016, Kelowna, British Columbia, Canada. (Year: 2016).*
Abstract "Beyond Standard Benchmarks: Parameterizing Performance Evaluation in Visual Object Tracking"; Luka Cehovin Zajc, Alan Lukezic, Ales Leonardis, Matej Kristan; Proceedings of the IEEE International Conference on Computer Vision (ICCV), 2017, pp. 3323-3331. (Year: 2017).*
Italian Patent and Trademark Office, Search Report of IT 102019000002659, dated Sep. 26, 2019.

* cited by examiner

CONTROL SYSTEM FOR BOATS

FIELD OF THE INVENTION

Object of the present invention is a control system for boats, comprising a direction control system and an acceleration/deceleration control system of at least one propulsion unit.

In particular, the direction control system comprises at least one direction control member and the acceleration/deceleration control system comprises at least one acceleration/deceleration control member.

The directional control member activates a directional unit for generating directional control signals intended to set the orientation of at least one motor and/or helm, whereas the acceleration/deceleration control member activates an acceleration/deceleration unit for generating acceleration/deceleration control signals intended to set at least the number of revolutions of the propulsion unit.

BACKGROUND OF THE INVENTION

Control devices of boats known in the art include a control station which enables the user to control the direction of the boat through the orientation of at least one motor/helm and the speed of the boat by regulating the number of revolutions of the propulsion units.

Generally, in motor boats known in the state of the art, the directional control member consists of a steering wheel that regulates the orientation of marine motors and/or helm by moving actuating cylinders: such systems can be electrical, hydraulic, mechanical, electro-hydraulic or electromechanical.

Moreover, the control station has control members of the lever type or the like that regulate the speed and the direction of the boat since the user establishes the forward, reverse or neutral gear and the revolution speed of the propulsion propellers depending on the position of the lever.

An example of a system known in the state of the art is described in the Patent EP2019036 owned by the Applicant and whose content is to be considered an integral part of the present patent application.

Regardless of the implementation of the direction control system and the acceleration/deceleration control system, the control systems known in the state of the art do not allow high maneuverability of the boat since they are intended to receive input from the pilot who mainly acts on the basis of limited visual information. Just consider a boat pulling a sportsperson practicing water-ski for example. Since the pilot is busy watching the water portion at the bow so that to avoid the presence of possible obstacles, an event such as the fall of the skier will generate a change in the speed of the boat, such as for example a deceleration and/or veering, by the guiding system, only once the pilot has noticed such fall after having temporarily shifted his glance from the bow to the stern.

The same goes for the presence of obstacles on the route which require an immediate intervention of the guiding system according to the perceptual information of the pilot which often is not even detectable, such as when switching from the slow navigation to the gliding one, which causes the bow to rise with a consequent decrease of the pilot's field of view.

Then, one should consider the possible presence of people in the water near the motors when igniting them, a circumstance which, especially in bigger boats, can only be detected through a careful inspection of the transom.

SUMMARY OF THE INVENTION

Object of the present invention is thus to achieve control systems for boats that are more maneuverable and reliable than known systems.

The invention achieves the purpose with a system as described in the beginning, wherein there is a display unit provided with at least one screen and a control system of at least one camera able to provide images of areas or zones which cannot be observed by those operating on the control system while steering the boat so that to allow driving the acceleration/deceleration and/or the directional unit according to the content of the aforesaid images.

The use of processing techniques for processing the images provided by the camera(s) and which can allow the system to intervene automatically on the speed of the boat, for example to veer and/or decelerate if a man should fall at sea or in the presence of obstacles on the route, is particularly advantageous.

The processing system can further allow operations of assisted docking or for keeping initial anchorage positions.

By increasing the perceptual level of the pilot and/or by providing him with processing systems able to automatically set the navigation parameters according to the manifestation of given events detected through the use of video cameras of the most diversified types, it is possible to achieve an extremely powerful and flexible system for the safe maneuverability of boats.

According to another feature of the invention, the image processing system may be configured to process the images collected by the camera(s) to compute wave height.

In this event, the invention includes a method for computing wave height, which includes acquiring at least two images of the water surface at the bow or stern and/or at the side(s) of the boat, each image at a different moment in time and determining, on the basis of trigonometric calculations, wave height from the two or more images.

In one embodiment, data may be added, to the data acquired from the camera(s) regarding wave height, for example as described in regard to the preceding embodiment, related to a measurement of inclination and/or acceleration of the vessel in one or more directions, in particular in a vertical direction.

Another object of the invention is providing a system in combination with a boat, the system comprising at least one camera and at least one image processing unit, which is configured to compute wave height, for example using dedicated software.

In one embodiment, the system further comprises at least an accelerometer and/or an inclinometer because the processing unit is configured to calculate wave height using software based on data obtained from images from the camera(s) or the accelerometers and/or the inclinometers.

BRIEF DESCRIPTION OF THE DRAWINGS

These and further characteristics and advantages of the present invention will become clearer in the following description of some embodiment examples shown in the accompanying drawings, in which.

DETAILED DESCRIPTION OF EMBODIMENTS OF THE INVENTION

Figure 1:
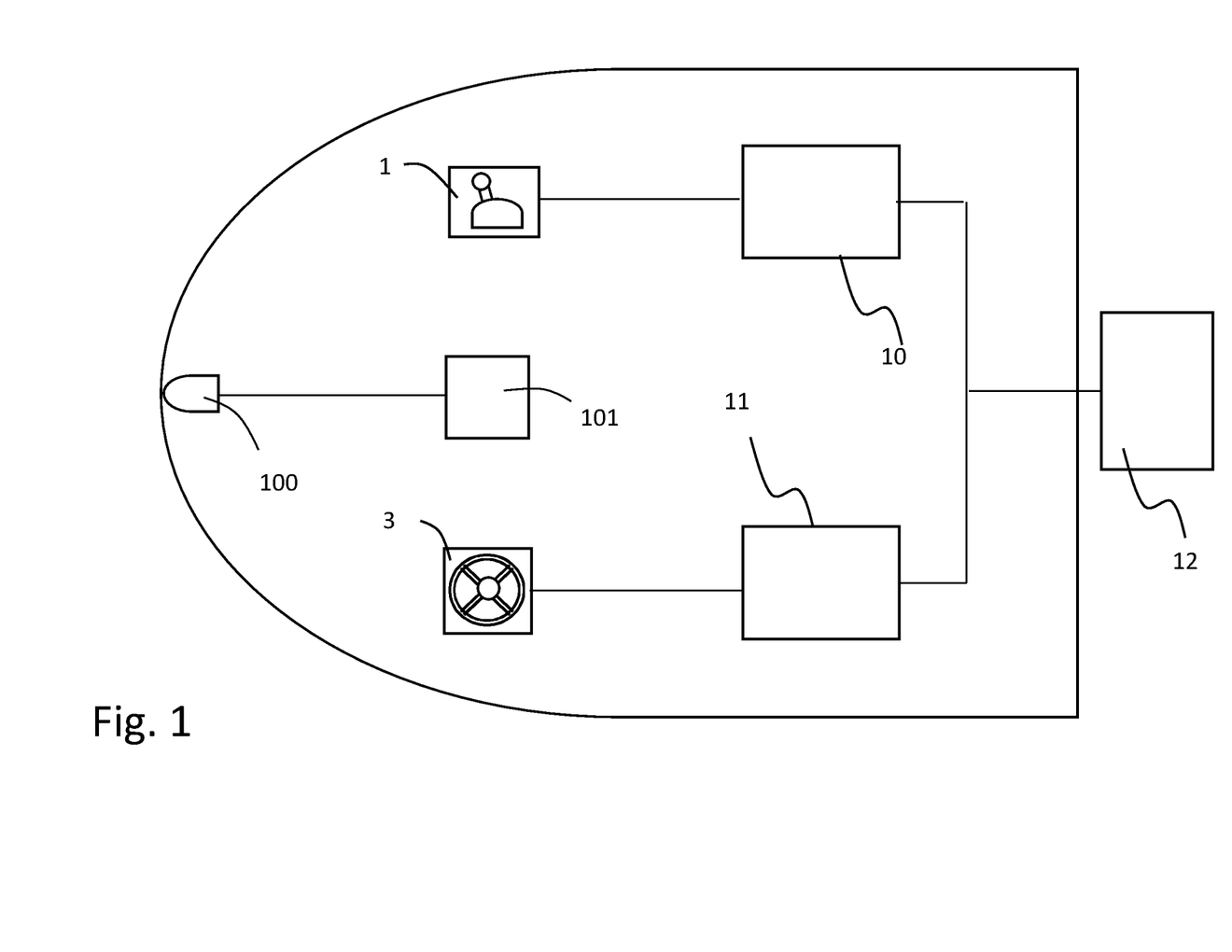
FIG. 1 shows a principle scheme of a possible embodiment of the system object of the present invention.

With particular reference to FIG. 1, the control system for boats object of the present invention comprises a direction control system, an acceleration/deceleration control system of at least one propulsion unit 12 and a view control system 101.

In particular, the direction control system comprises at least one directional control member 3, such as for example a steering wheel, the acceleration/deceleration control system comprises at least one acceleration/deceleration control member 1, such as, for example, a lever, whereas the view control system comprises at least one camera 100. The latter can be of any type, positioned on the boat or on an external vehicle, such as a drone, controllable by the boat. For example, it can be fixed or orientable, with or without zoom, for night vision or fog, infrared or the like.

The directional control member 3 activates a directional unit 11 for generating directional control signals intended to set the orientation of the propulsion unit 12 or helm.

The acceleration/deceleration control member 1 activates an acceleration/deceleration unit 10 for generating acceleration/deceleration control signals intended to set at least the number of revolutions of the propulsion propellers of the propulsion unit 12.

The two control members 1 and 3 thus allow controlling the boat, since the direction of the boat is set by orienting the propulsion unit 12 or helm, whereas the thrust and course of the boat, i.e. whether to make the boat proceed forward or rearward and at which speed, are established by setting the number of revolutions of the propulsion propellers.

The view control system 101 in turn provides images of areas or zones which cannot be observed by those operating on the control system while steering the boat so that to allow driving the acceleration/deceleration unit 10 and/or the directional unit 11 according to the content of the aforesaid images.

Figure 2:
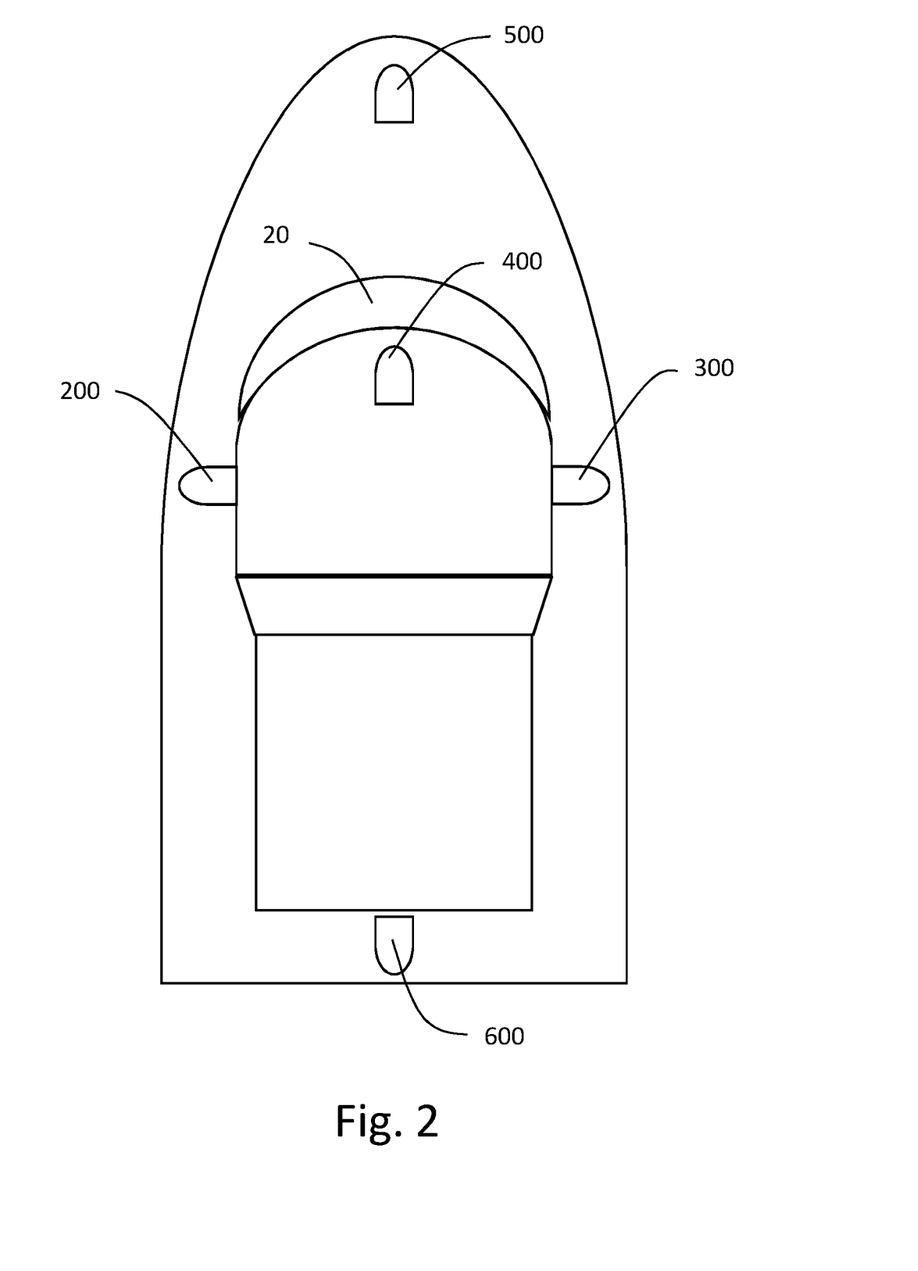
FIG. 2 shows an example of the positioning of cameras on a boat in a system according to the invention.

The view control system 101 can range from a simple monitor 6, which shows the frames of a camera 100 connected thereto, to a complex control system able to manage the operation of more cameras arranged in the most varied positions and with the most varied functionalities. By way of example, a configuration with five cameras is shown in FIG. 2, of which two side ones 200, 300, two front ones 400, 500, of which one in proximity of the windshield and one at the bow, and a rear one 600.

More in general, the view control system 101 can comprise a display unit able to show the framing of a plurality of cameras which allow shooting from more sides of the boat or outside of it, such as in the case of cameras positioned on drones.

The display unit 101 can comprise several monitors 6, each connected to a single camera, or a single monitor or anyhow a lesser number of monitors than the number of cameras installed. In this case, the screen can advantageously be subdivided in a number of zones at least equal to the number of cameras so that to simultaneously display images coming from different cameras or in a lesser number of zones than the number of cameras, a selecting unit of the images to be shown on said zones of the screen being provided and settable manually or automatically to allow a cyclic vision of all or part of the images coming from the cameras. Such selection can, for example, be operated by means of a manual switch or an electronic switch combined with a timer.

By way of example, whenever a rear camera 600 is present or anyhow so that to allow the shooting of the transom, the display unit can be configured to display the images coming from said camera when the motor or motors are turned on and before shifting into the forward or reverse gear. This way, it is possible to control the possible presence of a man at sea in proximity of the motors without having to move from the bridge with clear increase in navigation safety.

In a further advantageous configuration, whenever a front camera 500 and a rear camera 600 are present or anyhow at least two cameras so that allow the shooting at the bow and stern, the display unit 101 can be configured to display the images coming from the bow camera 500 if the forward gear is inserted or the images coming from the stern camera 600 if the reverse gear is inserted, so that to facilitate the boat maneuverability.

In alternative or in combination, it is also possible to provide the presence of several cameras, so that to allow shooting according to several directions, and a GPS. In this case, the display unit can advantageously be configured to detect the displacement of the boat in a given direction on the basis of the analysis of the signals coming from the GPS and to activate the shooting of that or those cameras which shoot the images in the same direction or in a direction intersecting the displacement direction of the boat, thus ensuring the maximum maneuverability thereof.

The described examples represent some examples which can also be used in non-particularly complex systems, in particular also in those pleasure boats with controls of mechanical or hydraulic type, i.e. without or with a limited use of computerized control systems.

The teachings of the present invention find their maximum benefits in the most evolved versions which provide for the use of electronic control units.

In this type of boats, a control unit 8 connected to the directional control member 3 and to the acceleration/deceleration unit 1 is typically present, which control unit 8 provides sensors adapted to detect the movement of said directional control member 3 and/or said acceleration/deceleration control member 1. The control unit 8 modifies the directional and acceleration/deceleration control signals on the basis of the signals received from the sensors during the movement of said control members. The communication between the control unit and the control members is typically via CAN BUS, denoted by reference 9 in FIGS. 3 to 7, which show some non-limiting examples of camera installations on boats provided with a control unit 8.

The directional control member 3 is typically a steering wheel, whereas the acceleration/deceleration unit 1 is typically a lever device for controlling the number of revolutions and selecting the forward, reverse and neutral gear of the motor. There can further be a joystick 2 for controlling the boat with a combined effect on the direction, number of motor revolutions and selection of the neutral, forward and reverse gear, as shown in the figures. There can be further devices, such as a GPS sensor 4 and/or other position sensors 5 such as gyroscopes, compass, radars, sonars, radio beacons, all interfaced with the control unit 8.

In this type of systems, the control unit 8 can also be interfaced with the view control system to receive the images from at least one camera. This way, the control unit 8 can set the images to be displayed on the screen 6 combined therewith or, in combination or in alternative, process said images, directly or by means of a processing unit 7, and modify the directional and/or acceleration/deceleration control signals according to the result of said processing. This configuration is particularly advantageous because it allows a complete integration of the view control system with the command and control devices of the boat.

For example, whenever at least one rear camera is present or anyhow so that to allow the shooting of a subject carrying out an activity involving pulling by the boat, such as water-ski or the like, the control unit can advantageously process the images coming from such shoot, recognize when the subject falls at sea and warn and/or automatically decrease the speed by acting on the acceleration/deceleration system of the boat with a progressive and predetermined deceleration ramp. The control unit can also be programmed to put the motor or motors of the boat in neutral, at the end of the ramp or upon reaching a predetermined number of revolutions, and possibly modify the directional control signals to perform a veer. This allows a prompt intervention for the recovery of the man at sea.

Whenever a front camera is present or anyhow so that to allow the shooting of the transom at the bow, the control unit can advantageously process the images coming from such shoot, recognize the presence of an obstacle and modify the directional control signals to automatically perform a veer to avoid the obstacle.

The possibility of processing the images, for example with pattern recognition techniques, segmentation, expert algorithms such as those of the predictive self-learning type, neural networks or the like, allows maximizing the benefits of the view control system by creating automatic control mechanisms of the navigation parameters.

For example, when one or more cameras are present and able to provide images of points of reference or immovable zones when the boat is at anchor, the control unit can be programmed to detect variations in images coming from the same frame that correspond to situations of leeway and to activate alarms and/or the acceleration/deceleration and/or directional control systems to recover the initial anchoring position. This functionality is particularly useful when a boat is buoyed mooring at night with a limited number of crew members, only the pilot at the limit.

When more cameras are present on the various sides of the boat, the control unit, by processing said images, is able to detect the presence of such obstacles and their distance from the boat so that to facilitate, for example, the approach operations with possible acoustic and/or visual signaling when said distance is less than a preset warning value.

The use of at least one orientable camera able to provide shots at several angles and/or of at least one camera positioned on a drone able to provide aerial shots according to several angles and at various distances from the boat is particularly advantageous.

In this case, the display unit can be configured to generate a projection from above where the obstacles detected by the camera or cameras and the contour of the boat are displayed, the latter being depicted on the screen on the basis of the dimensions of the boat and of the position of the cameras with respect to the boat.

Going back to the figures, they show various configurations of the system according to the invention in a simplified form.

Figure 3:
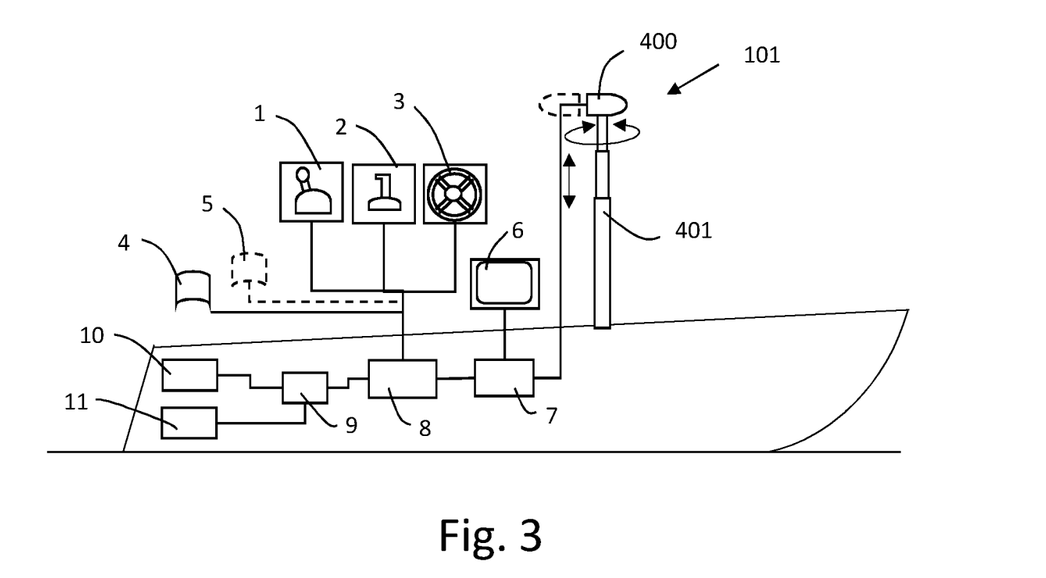
FIGS. 3 to 9 show principle schemes of further embodiments of the system object of the present invention.

FIG. 3 schematically shows a control system installed on a small boat provided with a camera 400 rotatable on a telescopic pole 401.

Figure 4:
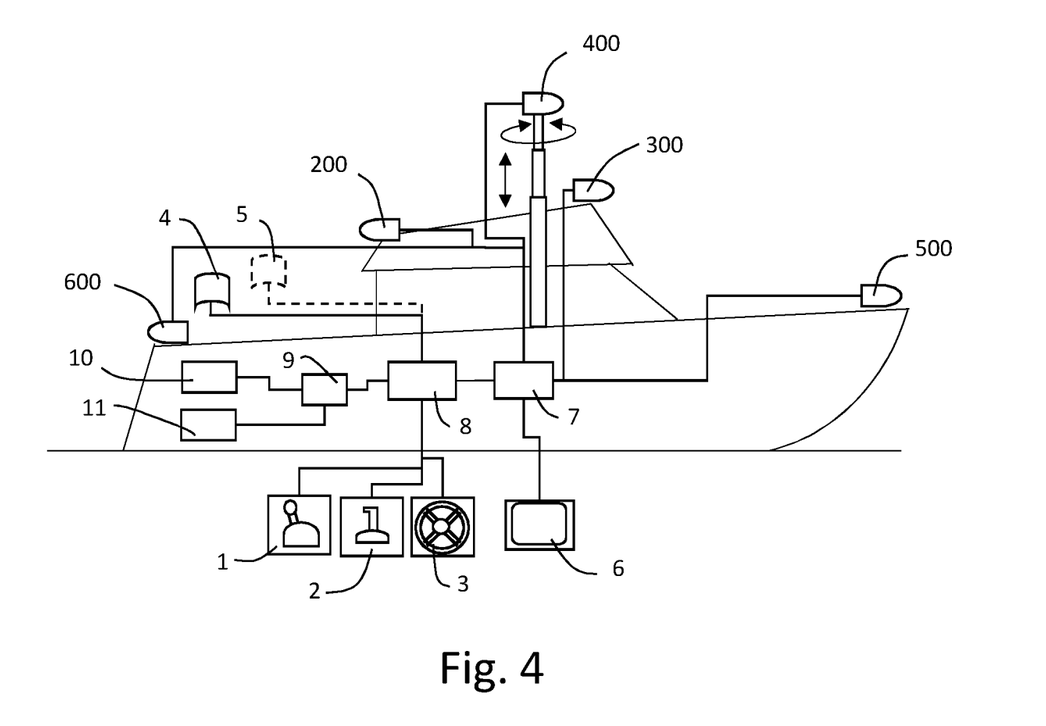

FIG. 4 shows a variant of the system on a cabin boat with a camera 400 on a telescopic pole like in the previous figure and with further cameras positioned as shown in FIG. 2.

Figure 5:
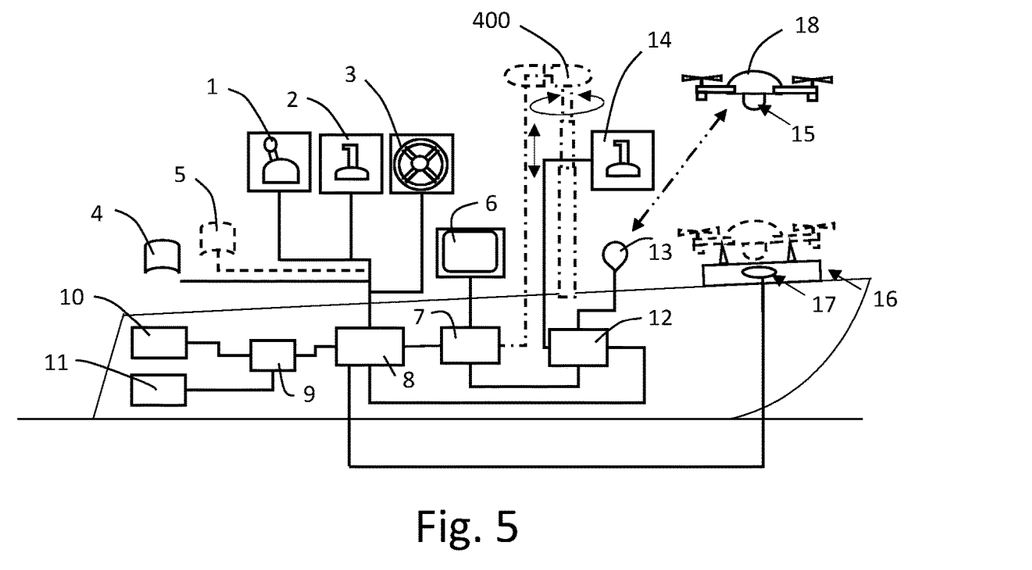

FIG. 5 shows a version on a small boat with a camera 15 positioned on a drone 18 in addition or in alternative to the central telescopic camera 400.

In this configuration, the boat typically has a parking station 16, for example at the bow, on which the drones can land and recharge thanks to the use of a charging unit 17 connected to the control unit 8. The drone 18 can be controlled via a control unit 12 interfaced with an antenna 13 and a joystick or other control device 14. It is also possible to provide that the same joystick 2 used for controlling the boat can be used for controlling the drone 18. In the figure, the control unit of the drone 12 is shown interfaced with the graphic processor 7 typically used for processing images, but it can be directly connected with the control unit 8 or independent therefrom.

The drone 18, or any remotely controlled aircraft with at least one camera aboard, can advantageously be piloted in reconnaissance to verify the presence of docking spots free from boats or of obstacles present on the route much before with respect to possible sightings from the boat.

Figure 6:
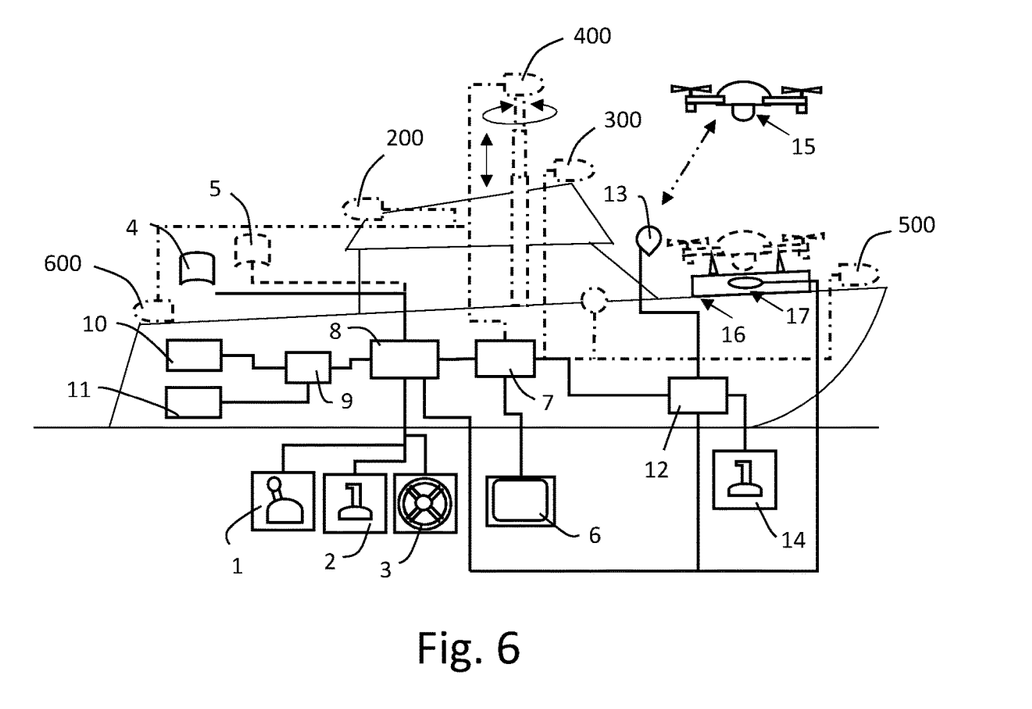

FIG. 6 shows a variant in which, in addition to the drone and possibly to the camera rotatable on the telescopic pole 400, there also are the cameras 200, 300, 500, 600 on the four sides of the boat so that to achieve a complete overview.

Figure 7:
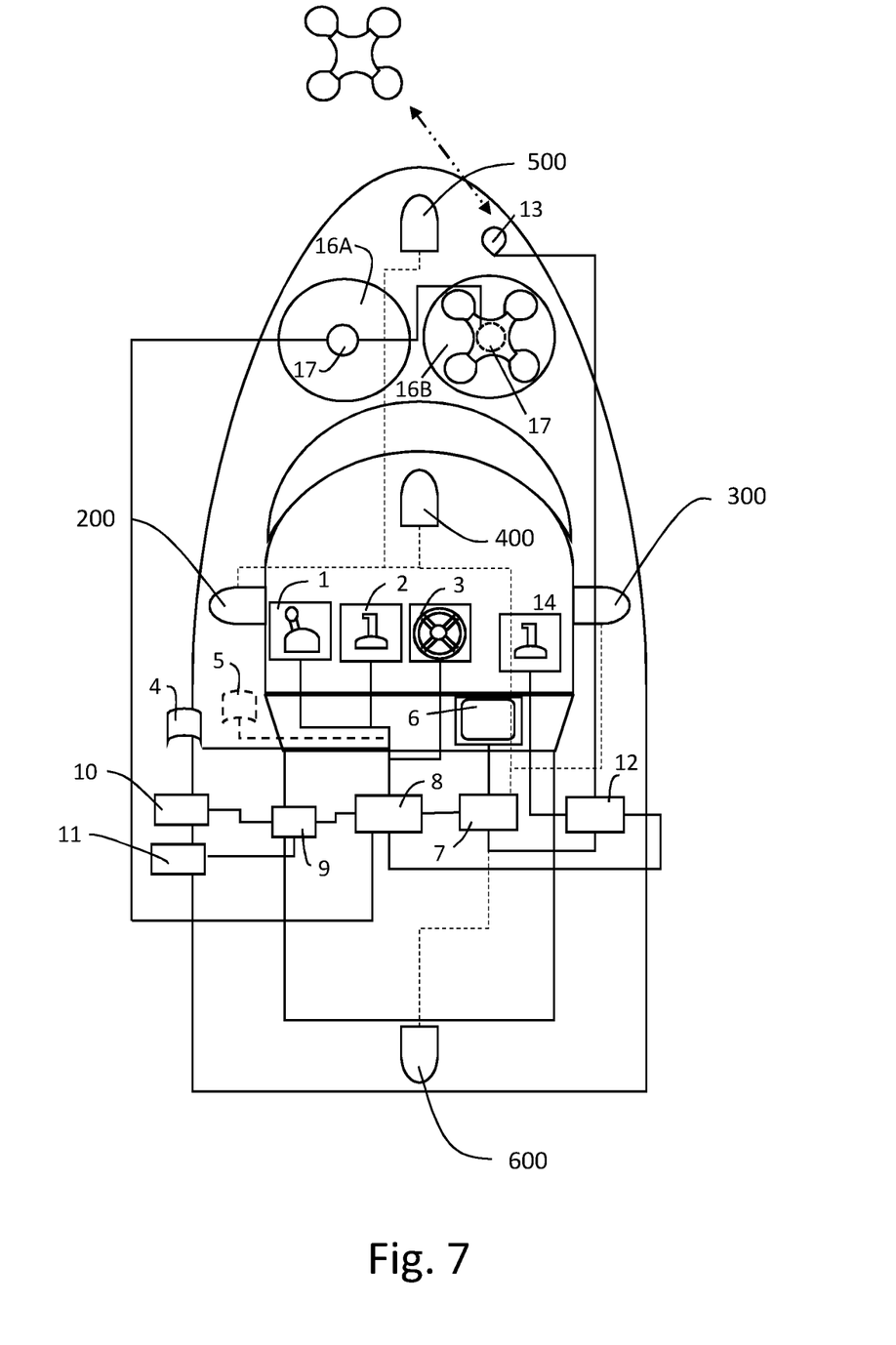

FIG. 7 shows the same configuration of FIG. 6 with a top view and two parking stations for drones 16A, 16B. This way, two drones to send in reconnaissance can also be used contemporaneously for the maximum flexibility of use.

Figure 8:
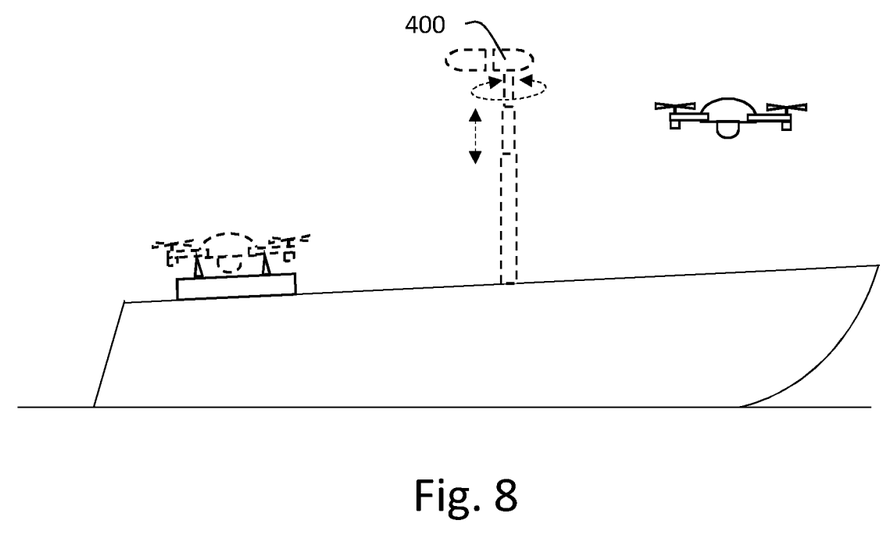
Figure 9:
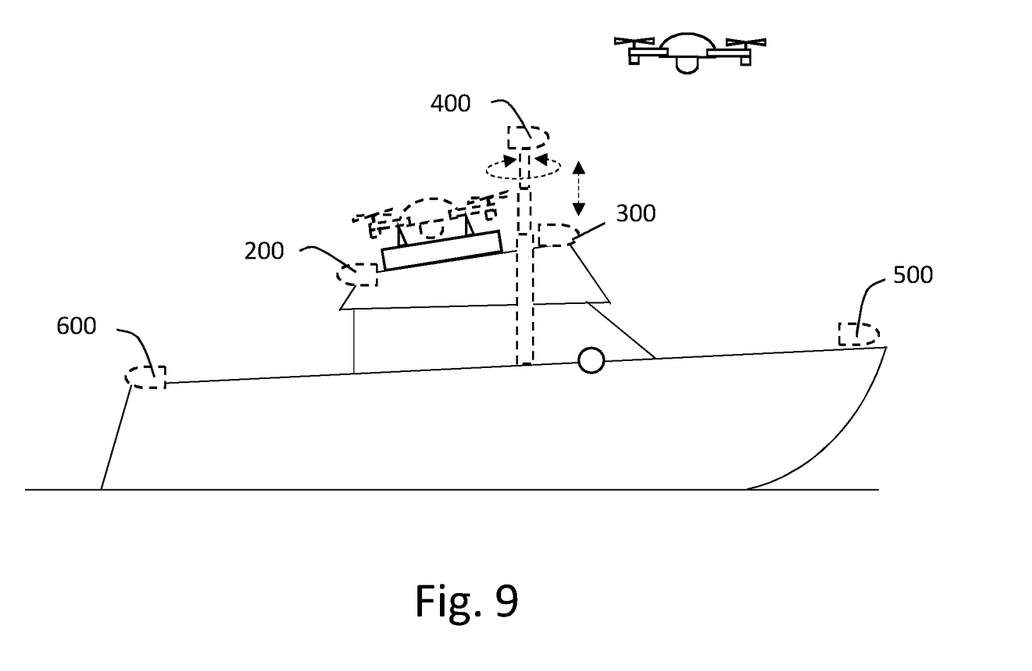

FIGS. 8 and 9 show variants in the position of the parking station(s) for drones 16, respectively at the stern and on the roof of the cabin.

Figure 10:
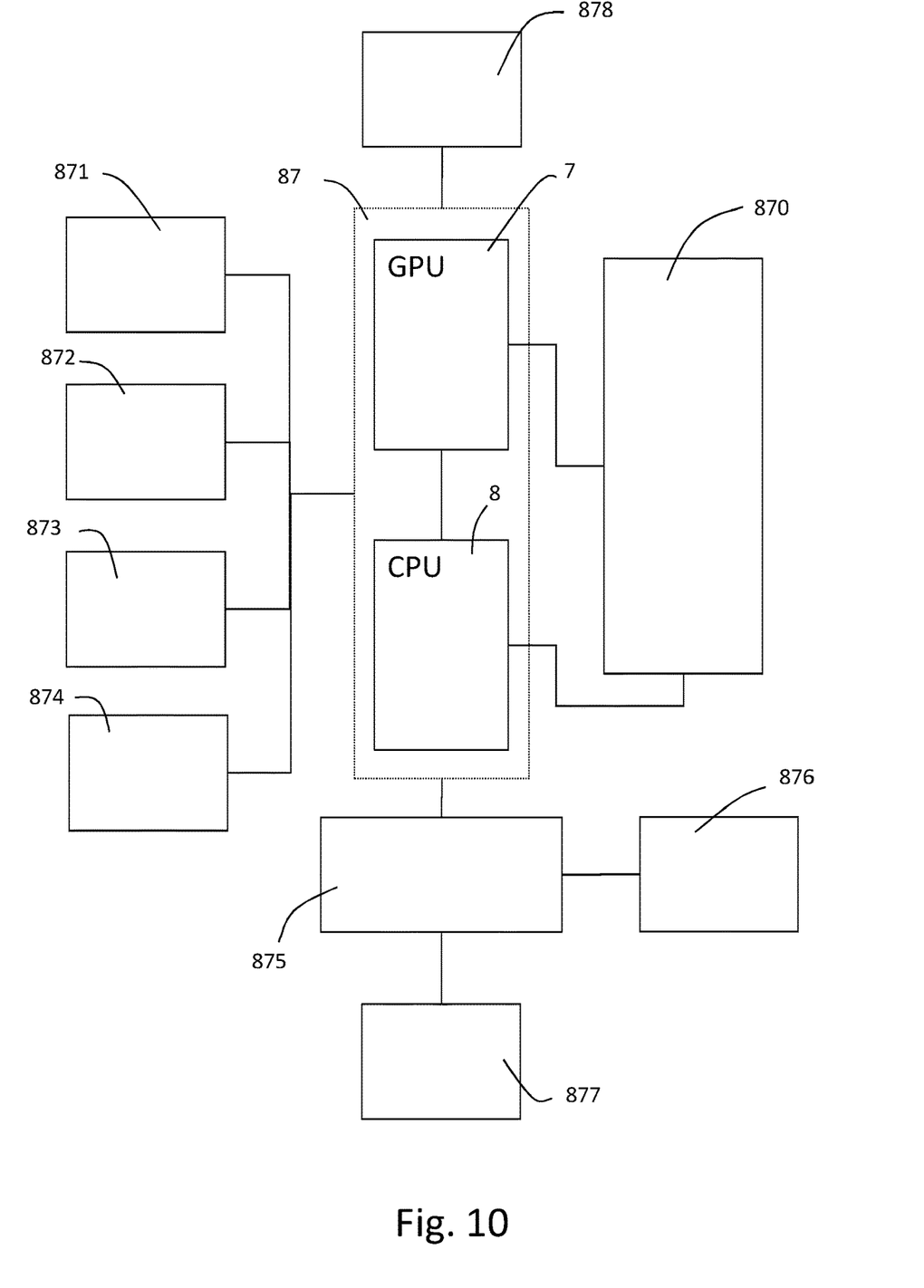
FIG. 10 shows a block scheme of the processing system according to an embodiment of the invention.

FIG. 10 shows the block scheme of the image processing system operated by the control unit 8 for automatically driving the actuating members of the boat depending on the inputs coming from the cameras.

An optional image processing unit, such as a GPU which supports the graphic processing, is denoted by numeral 7. The control unit/graphic processing unit assembly is specified in the figure with the reference 87 as a generic microprocessor unit. The graphic processing unit 7 may not be present, thus leaving to the control unit 8 the task of also carrying out this function.

The microprocessor unit 87 is connected with a memory 870 containing the program instructions for the processing of the images coming from the cameras and for sending actuating controls towards the various control members present on the boat.

Depending on the setting operated by the user by acting on the graphical interface 877, the setting of the controls to execute is inputted 875 in the unit 87 depending on the result of the processing of the images coming from the cameras. The setting of the controls can for example be selected from the list denoted by the reference 876. For example, controls can be sent to the motor actuators, the inverter, the trim tab, the bow-thruster, the helm, etc., denoted by 874 on the whole, as well as acoustic or visual signals to the user via an output interface 878.

Signals coming from other sensors, such as GPS, compass, gyroscopes, radars, sonars and the like, collectively denoted by 878, can be inputted in the microprocessor unit 87, for the maximum flexibility of control.

The microprocessor unit can also control the movement of the cameras and drones through the units respectively denoted by 871 and 872.

All this obviously in addition to or anyhow integrated with the navigation systems generally present in a boat.

Figure 11:
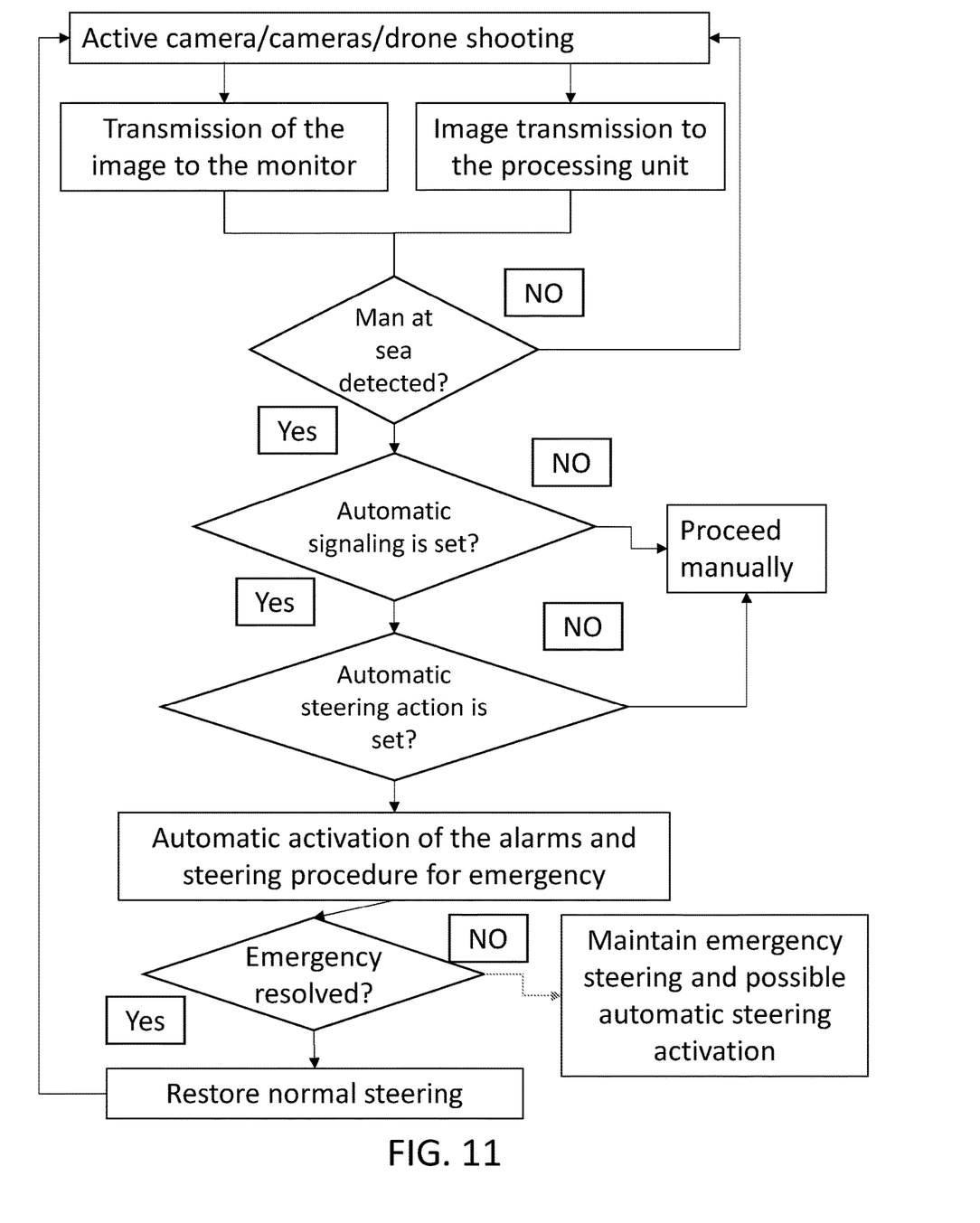
FIGS. 11 to 13 show the flowcharts of the operations carried out by the control unit in three specific applications depending on the processing of the images coming from the cameras aboard and/or drones in systems according to the invention.
Figure 12:
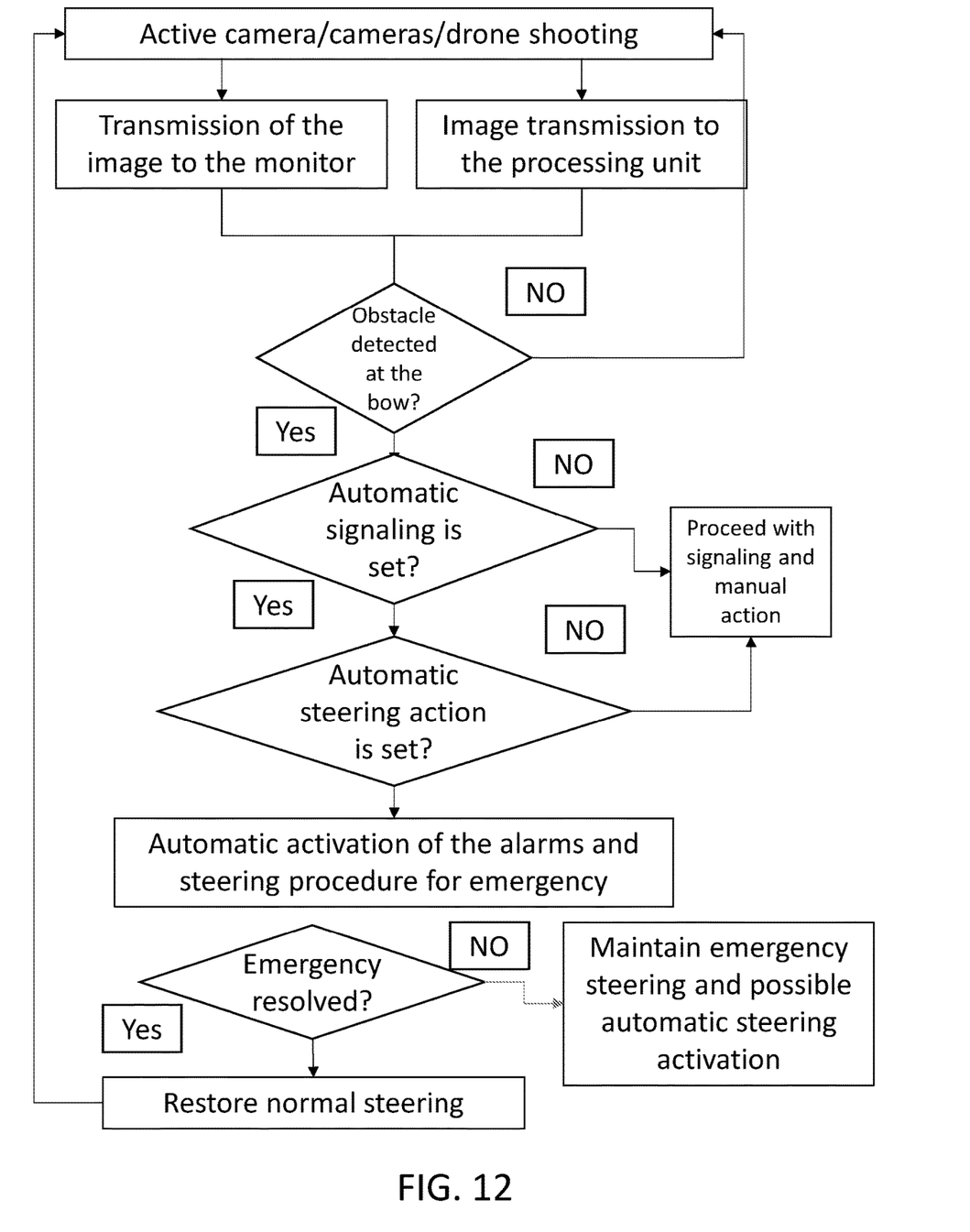
Figure 13:
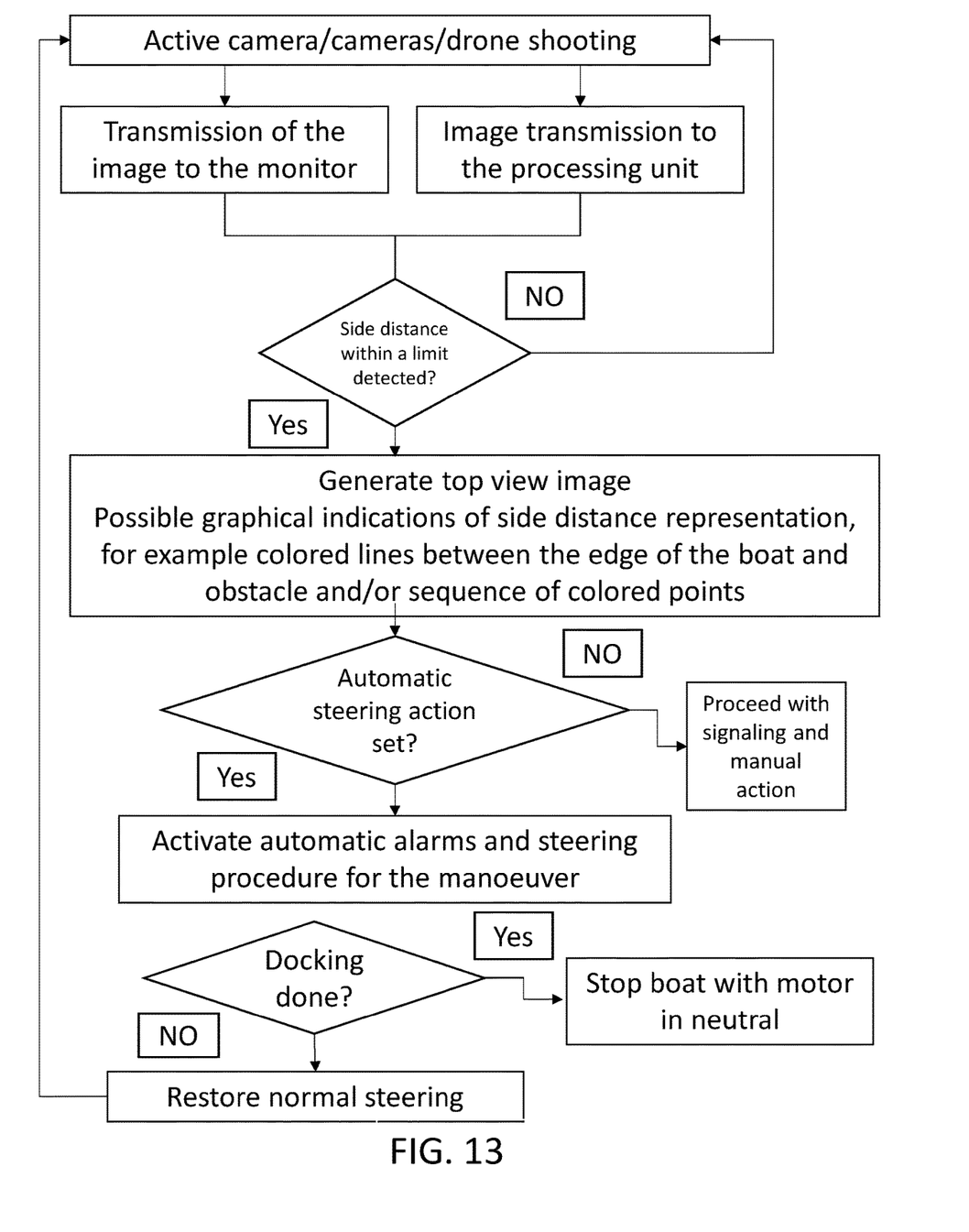

The processing unit 87, depending on the program instructions stored in the memory 870, is able to execute a given number of operations, some of which are set forth by way of example in FIGS. 11 to 13.

The flowchart for an emergency operation following the detection of a fall of a man at sea is set forth in the first example of FIG. 11.

The cameras, possibly also present on drones, shoot and transmit the images both on monitors and the processing unit. Whenever the fall of a man at sea is detected by the boat, if the automatic signaling and steering are set, an alarm is activated and the steering procedures are activated for the emergency, which procedures can provide, for example, for the setting of a deceleration of the speed of the boat with a progressive and predetermined deceleration ramp. Once the emergency has been resolved, the normal steering can be restored.

A further example is shown in FIG. 12. In this case, the control unit intervenes to ward off the impact with an obstacle at the bow.

The cameras, possibly also present on drones, shoot and transmit the sea portion present on the course of the boat and transmit the respective images both on monitors and the processing unit. Whenever from the analysis of the images there should be the presence of an obstacle at the bow, if the automatic signaling is set, as well as the automatic steering, then an alarm is activated and the steering procedures are activated for the emergency, which procedures can, for example, provide for the setting of a veering and/or deceleration of the speed of the boat. Once the emergency has been resolved, the normal steering can be restored.

The flowchart for an assisted docking operation is set forth in the example of FIG. 13.

The cameras, possibly also present on drones, shoot and transmit the images both on monitors and the processing unit. Whenever the side distance is less than a warning value, the control unit sets the generation of an image from above with possible graphic indications of the side distances, for example by using colored lines between the edge of the boat and the obstacle and/or a sequence of colored points.

If the automatic steering of the boat is set, the alarms and the steering procedures are activated for the docking maneuver by acting on the directional and acceleration/deceleration actuators until the docking has occurred with a consequent putting of the motor in neutral.

The invention can be widely varied constructively. It is for example possible to provide for the use of the front camera to facilitate the hooking maneuver of the boat on a trailer or to provide a camera which shoots under the keel of the boat to display the seabeds, for example for recreational activities. All without departing from the guiding principle described above and claimed below.

The invention claimed is:

1. A control system for a boat, comprising:
  a direction control system of a propulsion unit, the direction control system comprising a directional control member, the directional control member activating a directional unit configured to generate directional control signals that set an orientation of the propulsion unit; and
  an acceleration/deceleration control system of the propulsion unit, the acceleration/deceleration control system comprising an acceleration/deceleration control member activating an acceleration/deceleration unit configured to generate acceleration/deceleration control signals that set at least a number of revolutions of the propulsion unit;
  a display unit provided with a screen; and
  at least one camera having a control system configured to provide, to the display unit, images of areas or zones that cannot be observed by an operator of the control system while steering the boat so as to enable driving one or both of the acceleration/deceleration unit or the directional unit according to a content of the images,
  further comprising a control unit connected to the directional control member and to the acceleration/deceleration unit, the control unit comprising at least one sensor adapted to detect a movement of the directional control member and/or the acceleration/deceleration control member,
  wherein the control unit modifies the directional control signals and the acceleration/deceleration control signals based on the movement of the control members, and
  wherein the control unit is interfaced with the control system of the at least one camera so as to receive the images from the at least one camera and is configured to set the images to be displayed on at least part of the screen of the display unit and/or to process the images, directly or with a processing unit, and to modify one or both of the directional control signals or the acceleration/deceleration control signals based on a result of the processing of the images.

2. The control system according to claim 1, wherein the at least one camera comprises a plurality of cameras that enable shooting a plurality of parts of the boat or an outside of the boat, the display unit being configured to subdivide the screen in a plurality of zones at least equal to a number of the plurality of cameras so as to simultaneously display the images coming from different cameras of the plurality of cameras in different zones of the plurality of zones or in a lesser number of zones than the number of the plurality of cameras,
  further comprising a selecting unit of the images to be shown on the plurality of zones of the screen, the selecting unit being settable manually or automatically to enable a cyclic vision of all or part of the images coming from the plurality of cameras.

3. The control system according to claim 1, wherein the at least one camera comprises a rear camera that enables shooting a transom of the boat, the control system being configured to display the images coming from the rear camera when the propulsion unit or motors are turned on and before inserting a forward or a reverse gear.

4. The control system according to claim 1, wherein the at least one camera comprises a front camera and a rear camera that enable shooting at a bow and at a stern, the control system being configured to display the images coming from the front camera if a forward gear is inserted or the images coming from the rear camera if a reverse gear is inserted.

5. The control system according to claim 1, wherein the at least one camera comprises a plurality of cameras that enable shooting according to a plurality of directions and a GPS, the control system being configured to detect a displacement of the boat in a given direction based on an analysis of signals coming from the GPS and to activate the shooting of one or more of the plurality of cameras, which shoot the images in a same direction or in a direction intersecting a displacement direction of the boat.

6. The control system according to claim 1, further comprising at least one additional camera positioned on a drone and adapted to provide aerial shots according to several angles and at various distances from the boat.

7. The control system according to claim 1, wherein the at least one camera comprises at least one rear camera so as to enable shooting of a subject carrying out an activity involving pulling by the boat, the control unit being configured to process the images coming from the shooting, recognize when a subject falls at sea and warn and/or automatically decrease speed by acting on the acceleration/deceleration system of the boat with a progressive and predetermined deceleration ramp.

8. The control system according to claim 7, wherein the control unit is configured to put the propulsion unit of the boat in neutral, at an end of the deceleration ramp or upon reaching a predetermined number of revolutions, and optionally to modify the directional control signals to perform a veer.

9. The control system according to claim 1, wherein the at least one camera comprises a front camera that enables a shooting of a transom at the a bow, the control unit being configured to process the images coming from the shooting, recognize a presence of an obstacle, and modify the directional control signals to automatically perform a veer to avoid the obstacle.

10. The control system according to claim 1, wherein the at least one camera comprises a plurality of cameras shooting sides of the boat, the control unit being configured to process the images coming from the shooting, recognize when a person falls at sea, and modify the acceleration/deceleration control signals to automatically decrease speed by acting on the acceleration/deceleration system of the boat with a progressive and predetermined deceleration ramp.

11. The control system according to claim 1, wherein the at least one camera provide images of points of reference or fixed zones when the boat is at anchor, the control unit being configured to detect variations in the images coming from a same frame that correspond to situations of leeway and to activate alarms and/or the acceleration/deceleration and directional control system to recover an initial anchoring position.

12. The control system according to claim 1, wherein the at least one camera are configured to show obstacles present on different sides of the boat, the control unit processing the images to detect a presence of the obstacles and a distance of the obstacles from the boat so as to facilitate approach operations with possible acoustic and/or visual signals when the distance is less than a preset warning value.

13. The control system according to claim 1, wherein the control unit of the at least one camera is configured to determine a height of a wave from at least one, two, or more images of a temporal sequence of the images acquired by the at least one camera.

14. The control system according to claim 13, further comprising one or both of at least one accelerometer or at least one inclinometer that are connected to the control unit, the control unit being configured to determine the height of the wave from the images of the at least one camera and/or from measurement data of the at least one accelerometer or the at least one inclinometer.

15. The control system according to claim 1, wherein the at least one camera comprises an orientable camera adapted to provide shots according to a plurality of angles.

16. The control system according to claim 6, wherein the drone is piloted in reconnaissance to verify in advance a presence of spots free from boats for docking or of obstacles present on route.

17. The control system according to claim 16, wherein the display unit is configured to generate a projection from above where the obstacles detected by the at least one additional camera and a display of a contour of the boat, the contour being calculated based on dimensions of the boat and a position of the at least one additional cameras with respect to the boat.

* * * * *